May 22, 1928.   K. TESSKY   1,670,914
BELT DRIVE
Filed May 7, 1926
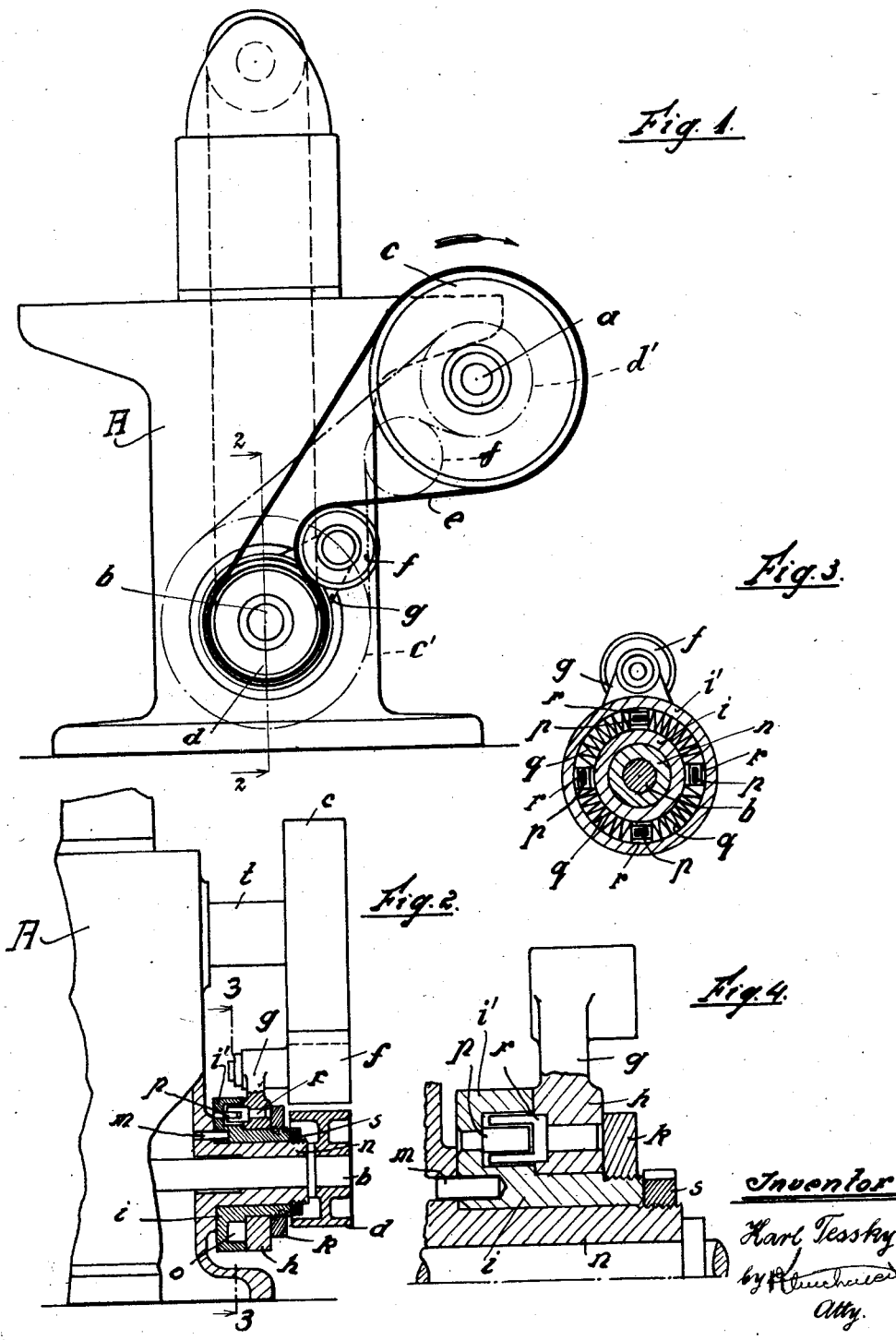

Patented May 22, 1928.

1,670,914

UNITED STATES PATENT OFFICE.

KARL TESSKY, OF ESSLINGEN-ON-THE-NECKAR, GERMANY.

BELT DRIVE.

Application filed May 7, 1926, Serial No. 107,516, and in Germany June 2, 1925.

My invention relates to belt drives and more especially to belt stretchers. It is an object of my invention to overcome certain drawbacks involved in belt drives where it is desired to exchange the pulleys on the driving and the driven shaft.

To this end I provide a belt stretcher which is adapted to be alternately secured on the bearings of the driving and the driven shaft so as to cooperate with the smaller pulley in each relative position of such pulleys, and instead of the usual pull-back spring which is attached to a point of the frame supporting the pulley shafts, I provide a spring which is supported in the body of the belt stretcher so that the belt stretcher and spring constitute a self-contained unit.

A belt stretcher of the usual type comprises a stretching roller, a rocking lever on which the roller is supported, and means such as springs for applying the roller against the slack side of the belt.

The problem of adapting a belt stretcher to a variable-speed belt drive, that is, a belt drive comprising exchangeable pulleys, may be solved either by providing two belt stretchers operating alternately or two pivots for a single belt stretcher. The first solution is unsatisfactory because it necessitates two stretchers whereas only one is operative at a time. The second solution is also unsatisfactory because with a pull-back spring of the ordinary type it is necessary to provide a separate point of attachment for one end of the spring corresponding to each position of the stretcher.

In the drawings affixed to this specification and forming part thereof a belt drive embodying my invention is illustrated diagrammatically by way of example.

In the drawings,

Fig. 1 is an elevation of a machine equipped with my belt drive,

Fig. 2 is an end elevation, partly in section on the line 2—2 of Fig. 1,

Fig. 3 is another section on the line 3—3 of Fig. 2, and

Fig. 4 is another section on the line 2—2 of Fig. 1, showing the upper portion of the stretcher on a larger scale.

Referring to the drawings, A is the machine frame, $a$ is the driving shaft and $b$ is the driven shaft, $c$ and $d$ are pulleys keyed respectively on the driving and driven shafts, $e$ is the belt connecting said pulleys and $f$ is the tension roller.

With the parts arranged as shown in full lines in Fig. 1, the larger pulley $c$ is keyed on the driving shaft $a$ and the smaller pulley $d$ on the driven shaft $b$. The tension roller $f$ must accordingly be arranged in the vicinity of the smaller pulley $d$. In the converse arrangement, as indicated in dot- and dash lines in Fig. 1, the smaller pulley $d'$ is keyed on the driving shaft $a$ and the larger pulley $c'$ on the driven shaft $b$. The tension roller $f$ must now be located in the vicinity of the driving shaft $a$ as the smaller pulley is keyed on this shaft.

The tension roller $f$ is supported on a rocking lever $g$ which is integral with an annular casing $h$ adapted to rock on a tubular pivot $i$ and held thereon against axial displacement by a shoulder $i'$ of the tubular pivot and a nut $k$ which is screwed onto the opposite end of the pivot. The tubular pivot $i$ is adapted to be placed alterately on the journal sleeve $n$ of shaft $b$ and on the journal sleeve $t$ of shaft $a$, and is held thereon against axial displacement by a nut $s$ and against rotation by two pins $m$ which are secured in the frame A and engage a hole in the shoulder $i'$. Only the pin $m$ for the journal sleeve $n$ is shown in Figs. 2 and 4, but the pin for the journal sleeve $t$ is exactly alike. An annular groove $o$ is formed in the inner face of the shoulder $i'$ and abutment pins $p$ are arranged in the groove. An abutment pin $r$ which may be forked at its inner end is secured in the casing $h$ for each pin $p$ so that the inner ends of both sets of pins project into the groove $o$, and curved helical springs $q$ are inserted in the groove $o$ between the pins $p$ and $r$. In the normal position of parts the springs tend to hold the fork-shaped ends of the pins $r$ in registering position with regard to the pins $p$ but when the arm $g$ is rotated the springs will be compressed and exert a corresponding reaction on the roller $f$. It will appear that the springs $q$ act in either direction; this is necessary on account of the respective positions of the stretcher on the bearings $n$ and $t$.

In the position illustrated, the hollow pivot $i$ of the casing $g$ is seated on the journal sleeve $n$ of the driven shaft $b$. When it is desired to exchange the pulleys $c$ and $d$, the nut $s$ is removed and the tubular pivot $i$ is withdrawn from the journal sleeve $n$, placed on the journal sleeve $t$ secured by the nut $s$ and held against rotation by the pin $m$ as described.

I wish it to be understood that I do not desire to be limited to the exact details of construction shown and described for obvious modifications will occur to a person skilled in the art.

I claim:

1. Belt drive comprising a driving and a driven shaft, a journal sleeve for each shaft, said journal sleeves being arranged to form a support for a belt stretcher, an exchangeable pulley on each shaft, a belt on said pulleys, and a belt stretcher removably mounted on the journal sleeve of one shaft and adapted to be alternately placed on the journal sleeve of the other shaft.

2. Belt drive comprising a driving and a driven shaft, a journal sleeve for each shaft, said journal sleeves being arranged to form a support for a belt stretcher, a smaller and a larger pulley adapted to be placed alternately on each shaft, a belt on said pulleys, and a belt stretcher removably mounted on the journal sleeve of one shaft and adapted to be placed alternately upon the shaft on which the smaller pulley is secured.

3. Belt drive comprising a driving and a driven shaft, a journal sleeve for each shaft, said journal sleeves being arranged to form a support for a belt stretcher, a smaller and a larger pulley adapted to be placed alternately on each shaft, a belt on said pulleys, and a belt stretcher removably mounted on the journal sleeve of one shaft and adapted to be placed alternately on the journal sleeve of that shaft on which the smaller pulley is secured.

4. Belt drive comprising a driving and a driven shaft, a journal sleeve for each shaft, said journal sleeves being arranged to form a support for a belt stretcher, a smaller and a larger pulley adapted to be placed alternately on each shaft, a belt on said pulleys, and a belt stretcher removably mounted on the journal sleeve of one shaft and adapted to be placed alternately upon the shaft on which the smaller pulley is secured, resilient means active in both directions being provided on said belt stretcher to hold same in a predetermined position.

In testimony whereof I affix my signature.

KARL TESSKY.